United States Patent [19]

Jureller et al.

[11] Patent Number: 5,194,416
[45] Date of Patent: Mar. 16, 1993

[54] MANGANESE CATALYST FOR ACTIVATING HYDROGEN PEROXIDE BLEACHING

[75] Inventors: Sharon H. Jureller, Haworth; Judith L. Kerschner, Ridgewood, both of N.J.

[73] Assignee: Lever Brothers Company, Division of Conopco, Inc., New York, N.Y.

[21] Appl. No.: 798,396

[22] Filed: Nov. 26, 1991

[51] Int. Cl.$^5$ ............................................. B01J 31/00
[52] U.S. Cl. ....................................... 502/167; 8/111; 252/186.26; 252/186.29; 252/186.39; 252/186.4; 252/186.41; 502/150
[58] Field of Search ....................... 252/186.26, 186.29, 252/186.39, 186.4, 186.41; 8/111; 502/167, 150

[56] References Cited

U.S. PATENT DOCUMENTS 4,711,748 12/1987 Irwin et al. ...................... 252/186.39
4,728,455 3/1988 Rerek ...................................... 252/99

OTHER PUBLICATIONS

Journal of American Chemical Society, (Wieghardt et al), 1988, vol. 110, No. 22, p. 7398.

Journal of Chemical Society—Chemical Communications, (Wieghardt et al), 1985, p. 1145.

Primary Examiner—Asok Pal
Attorney, Agent, or Firm—Milton L. Honig

[57] ABSTRACT

Novel bleach and oxidation catalysts are reported as well as a bleaching-detergent composition employing these catalysts and a method for removing stains from substrates. The catalysts are manganese complexes of the formula:

$$[LMn^{IV}(OR)_3]Y,$$

wherein
Mn is manganese in the +4 oxidation state;
R is a $C_1$–$C_{20}$ radical selected from the group consisting of alkyl, cycloalkyl, aryl, benzyl and radical combinations thereof;
at least two R radicals may also be connected to one another so as to form a bridging unit between two oxygens that coordinate with the manganese;
L is a ligand selected from a $C_3$–$C_{60}$ radical having at least 3 nitrogen atoms coordinating with the manganese; and
Y is an oxidatively-stable counterion.

19 Claims, No Drawings

MANGANESE CATALYST FOR ACTIVATING HYDROGEN PEROXIDE BLEACHING

BACKGROUND OF THE INVENTION

1. Field of the Invention

The invention concerns novel catalysts for activating hydrogen peroxide bleaching, detergent compositions containing the novel catalysts and a method for bleaching and/or cleaning substrates employing the aforementioned compositions.

2. The Related Art

Peroxide bleaching agents for use in laundering have been known for many years. Such agents are effective in removing stains, such as tea, fruit and wine stains, from clothing at or near boiling temperatures. The efficacy of peroxide bleaching agents diminishes sharply at temperatures below 60° C.

It is known that many transition metal ions catalyze the decomposition of $H_2O_2$ and $H_2O_2$-liberating percompounds, such as sodium perborate. It has also been suggested that transition metal salts together with a chelating agent be employed to activate peroxide compounds to render them usable for satisfactory bleaching at lower temperatures. Not all combinations of transition metals with chelating agents are suitable for improving the bleaching performance of peroxide compound bleaches. Many combinations indeed show no effect, or even a worsening effect, on the bleaching performance; no proper rule seems to exist by which the effect of metal ion/chelating agent combinations on the bleaching performance of peroxide compound bleaches can be predicted.

All these prior art suggestions are based on systems in which free metal ion is the catalytically active species and consequently produce results in practice that are often very inconsistent and/or unsatisfactory, especially when used for washing at low temperatures.

For a transition metal to be useful as a bleach catalyst in a detergent bleach composition, the transition metal compound must not unduly promote peroxide decomposition by nonbleaching pathways and must be hydrolytically and oxidatively stable.

Hitherto the most effective peroxide bleach catalysts are based on cobalt as the transition metal.

The addition to detergent formulations of catalysts based on the transition metal cobalt is, however, a less acceptable route as judged from an environmental point of view.

In a number of patents the use of the environmentally acceptable transition metal manganese is described. All these applications are, however, based on the use of the free manganese ion and do not fulfill the requirement of hydrolytic stability. U.S. Pat. No. 4,728,455 discusses the use of Mn(III)-gluconate as peroxide bleach catalyst with high hydrolytic and oxidative stability; relatively high ratios of ligand (gluconate) to Mn are, however, needed to obtain the desired catalytic system. Moreover, the performance of these Mn-based catalysts is inadequate when used for bleaching in the low temperature region of about 20° to 40° C., and they are effective only against certain stains.

We have now discovered a class of well-defined transition metal complexes which fulfill the demands of stability (both during the washing process and in the dispenser of the washing machine), and which are extremely active, even in the low temperature region, for catalyzing the bleaching action of peroxy compounds on a wide variety of stains.

More recently, there has been disclosed in copending U.S. Pat. applications Ser. Nos. 07/703,554 and 07/703,555, both to Favre et al. each filed May 21, 1991, a series of manganese complexes with dinuclear manganese surrounded by coordinating ligands, especially 1,4,7-trimethyl-1,4,7-triazacyclononane (Me-TACN), having oxygen bridges between the metal centers. These complexes are extremely active, even at low temperatures in catalyzing peroxy compounds. A wide variety of laundry stains are removable through these materials.

While the dinuclear manganese complex catalysts are a substantial advance in the art, the cost of these materials is rather high. Additionally, it would be desirable to find alternative catalysts that are effective with lower levels of peroxy compounds (e.g. perborate) and that would improve performance in removing hydrophobic stains such as tomato sauce.

Consequently, it is an object of the present invention to provide an improved transition metal catalyst for the bleach activation of oxidants, especially peroxy compounds, including hydrogen peroxide and hydrogen peroxide liberating or generating compounds, as well as peroxyacid compounds including peroxyacid precursors, over a wide class of stains at lower temperatures.

Another object of the present invention is to provide an improved bleach-containing detergent composition which is effective to clean laundry at relatively low temperatures.

Still another object of the present invention is to provide an aqueous laundry wash media containing new, improved detergent bleach formulations.

A further object of the present invention is to provide an improved bleaching system comprising a peroxy compound bleach and a transition metal catalyst for the effective use in the washing and bleaching of substrates, including laundry, dentures and hard surfaces (such as in machine dishwashing, general cleaning etc.), and in the textile, paper and wood pulp industries and other related industries.

A still further object of the present invention is to provide a method for bleaching substrates such as laundry; hard surfaces, including dishware; dentures; textiles; paper and pulp; and other substances through use of a novel transition metal catalyst and a peroxy compound bleach.

These and other objects of the present invention will become more apparent through the following description of select embodiments, features and advantages which are described below.

SUMMARY OF THE INVENTION

A catalyst is provided having the formula:

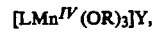

wherein
- Mn is manganese in the +4 oxidation state;
- R is a $C_1$–$C_{20}$ radical selected from the group consisting of alkyl, cycloalkyl, aryl, benzyl and radical combinations thereof;
- at least two R radicals may also be connected to one another so as to form a bridging unit between two oxygens that coordinate with the manganese;

L is a ligand selected from a $C_3$–$C_{60}$ radical having at least 3 nitrogen atoms coordinating with the manganese; and Y is an oxidatively-stable counterion.

A bleaching composition is also provided comprising:

(i) from about 1 to about 60% by weight of a peroxy compound; and (ii) a manganese complex of the structure:

[LMn$^{IV}$(OR)$_3$]Y, present in an effective amount for catalyzing bleaching activity of the peroxy compound.

Furthermore, a method is provided for bleaching a stained substrate, the method comprising contacting the stained substrate in an aqueous medium with a peroxy compound and a manganese complex of the formula:

[LMn$^{IV}$(OR)$_3$]Y, each in an effective amount to interact with one another and provide a cleaning effect upon the substrate.

DETAILED DESCRIPTION

A series of mononuclear, manganese (IV) complexes have been discovered which are highly efficient catalysts for activating peroxygen compounds to thereby achieve the bleaching of substrates. Unlike the dinuclear manganese (IV) complexes, the compounds of the present invention can operate at equivalent levels with 30 to 50% less peroxygen compound present. The new complexes are also more effective with respect to tomato stain removal. The new manganese complexes have the general structure:

[LMn$^{IV}$(OR)$_3$]Y,  (A)

wherein

Mn is manganese in the +4 oxidation state;

R is a $C_1$–$C_{20}$ radical selected from the group consisting of alkyl, cycloalkyl, aryl, benzyl and radical combinations thereof;

at least two R radicals may also be connected to one another so as to form a bridging unit between two oxygens that coordinate with the manganese;

L is a ligand selected from a $C_3$–$C_{60}$ radical having at least 3 nitrogen atoms coordinating with the manganese; and Y is an oxidatively-stable counterion.

Counterion Y is usually an anion selected from the group consisting of Cl$^-$, Br$^-$, I$^-$, NO$_3^-$, ClO$_4^-$, NCS$^-$, PF$_6^-$, RSO$_4^-$, OAc$^-$, BPh$_4^-$, CF$_3$SO$_3^-$, RSO$_3^-$, and RSO$_4^-$.

Ligands which are suitable for the present invention are for illustrative purposes only, listed through the structural acyclic and cyclic formulas which follow:

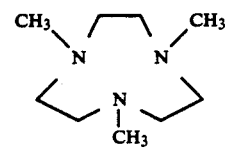  I

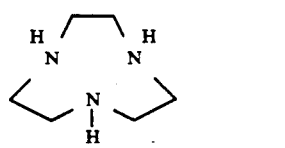  II

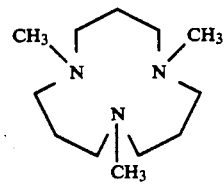  III

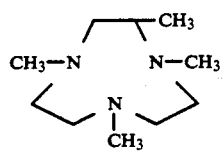  IV

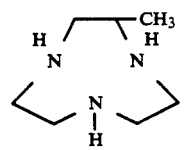  V

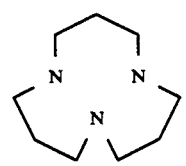  VI

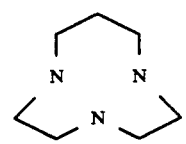  VI

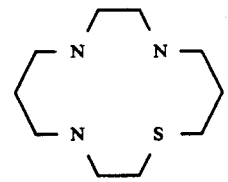  VIII

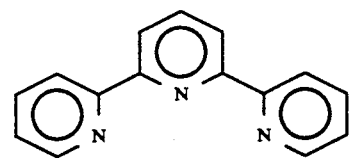  IX

CH$_3$N(CH$_2$CH$_2$CH$_2$N(CH$_3$)$_2$)$_2$   X

HN(CH$_2$CH$_2$NH$_2$)$_2$   XI

CH$_3$N(CH$_2$CH$_2$N(CH$_3$)$_2$)$_2$   XII

CH$_3$C(CH$_2$CH$_2$N(CH$_3$)$_2$)$_3$   XIII

The most preferred ligands are I–V with I particularly preferred.

Ligand I is 1,4,7-trimethyl-1,4,7-triazacyclononane, coded as Me-TACN; ligand II is 1,4,7-triazacyclononane, coded as TACN; ligand III is 1,5,9-trimethyl-1,5,9-triazacyclododecane, coded as Me-TACD; ligand IV is 2-methyl-1,4,7-trimethyl-1,4,7-triazacyclononane, coded as Me/Me-TACN; and ligand V is 2-methyl-1,4,7-triazacyclononane, coded as Me/TACN.

Any of these complexes, either preformed or formed in situ during the washing process, are useful catalysts for the bleach activation of peroxy compounds over a wide class of stains at lower temperatures in a much more effective way than the Mn-based catalysts of the art hitherto known. Furthermore, these catalysts exhibit a high stability against hydrolysis and oxidation, even in the presence of oxidants such as hypochlorite.

Another advantage is that, in many respects, the instant catalysts are better than any other Mn-complexes proposed in the art. They are not only effective in enhancing the bleaching action of hydrogen peroxide bleaching agents but also of organic and inorganic peroxyacid compounds.

A surprising feature of the bleach systems according to the invention is that they are effective on a wide range of stains including both hydrophilic and hydrophobic stains. This is in contrast with all previously proposed Mn-based catalysts, which are only effective on hydrophilic stains.

A further surprising feature is that they are compatible with detergent enzymes, such as proteases, cellulases, lipases, amylases, oxidases etc.

Accordingly, in one aspect, the invention provides a bleaching or cleaning process employing a bleaching agent selected from the group of peroxy compound bleaches including hydrogen peroxide, hydrogen peroxide liberating or generating compounds, peroxyacids and their salts, and peroxyacid bleach precursors and mixtures thereof, which process is characterized in that the bleaching agent is activated by a catalytic amount of a Mn-complex of general formula (A) as defined hereinbefore.

The catalytic component is a novel feature of the invention. The effective level of the Mn-complex catalyst, expressed in terms of parts per million (ppm) of manganese in the aqueous bleaching solution, will normally range from 0.001 ppm to 100 ppm, preferably from 0.01 ppm to 20 ppm, most preferably from 0.1 ppm to 10 ppm. Higher levels may be desired and applied in industrial bleaching processes, such as textile and paper pulp-bleaching. The lower range levels are primarily destined and preferably used in domestic laundry and dishwashing operations. Levels of peroxy compound in the aqueous solution will range from 0.01 ppm to 250 ppm, optimally from 0.5 ppm to 100 ppm.

In another aspect, the invention provides an improved bleaching composition comprising a peroxy compound bleach as defined above and a catalyst for the bleaching action of the peroxy compound bleach, the catalyst comprising the aforesaid Mn-complex of general formula (A).

As indicated above, the improved bleaching composition has particular application in detergent formulations to form a new and improved detergent bleach composition within the purview of the invention, comprising the peroxy compound bleach, the aforesaid Mn-complex catalyst, a surface-active material, and usually also detergency builders and other known ingredients of such formulations, as well as in the industrial bleaching of yarns, textiles, paper, woodpulp and the like.

The Mn-complex catalyst will be present in the detergent formulations in amounts so as to provide the required level in the wash liquor. When the dosage of the detergent bleach composition is relatively low, e.g. about 1 and 2 g/l by consumers in Japan and the USA, respectively, the Mn content in the formulation is 0.0025 to 0.5%, preferably 0.005 to 0.25%. At higher product dosage as used e.g. by European consumers, the Mn content in the formulation is 0.0005 to 0.1%, preferably from 0.001 to 0.05%.

Compositions comprising a peroxy compound bleach and the aforesaid bleach catalyst are effective over a wide pH range of between 7 and 13, with optimal pH range lying between 8 and 11.

The peroxy compound bleaches which can be utilized in the present invention include hydrogen peroxide, hydrogen peroxide-liberating compounds, hydrogen peroxide-generating systems, peroxyacids and their salts, and peroxyacid bleach precursor systems, and mixtures thereof.

Hydrogen peroxide sources are well known in the art. They include the alkali metal peroxides, organic peroxide bleaching compounds such as urea peroxide, and inorganic persalt bleaching compounds, such as the alkali metal perborates, percarbonates, perphosphates and persulphates. Mixtures of two or more of such compounds may also be suitable. Particularly preferred are sodium percarbonate and sodium perborate and, especially, sodium perborate monohydrate. Sodium perborate monohydrate is preferred to tetrahydrate because of its excellent storage stability while also dissolving very quickly in aqueous bleaching solutions. Sodium percarbonate may be preferred for environmental reasons. These bleaching compounds may be utilized alone or in conjunction with a peroxyacid bleach precursor. Use of precursors may be of advantage for improving the overall whiteness appearance of white fabrics as well as for hygiene purposes.

Peroxyacid bleach precursors are known and amply described in the literature, such as in the GB Patents 836,988; 864,798; 907,356; 1,003,310 and 1,519,351; German Patent 3,337,921; EP-A-0185522; EP-A-0174132; EP-A-0120591; and U.S. Pat. Nos. 1,246,339; 3,332,882; 4,128,494; 4,412,934 and 4,675,393.

Another useful class of peroxyacid bleach precursors is that of the quaternary ammonium substituted peroxyacid precursors as disclosed in U.S. Pat. Nos. 4,751,015 and 4,397,757, in EP-A-284292, EP-A-331,229 and EP-A-0303520. Examples of peroxy-acid bleach precursors of this class are:

2-(N,N,N-trimethyl ammonium) ethyl-4-sulphophenyl carbonate - (CSPC);

N-octyl,N,N-dimethyl-N10-carbophenoxy decyl ammonium chloride - (ODC);

3-(N,N,N-trimethyl ammonium) propyl sodium-4-sulphophenyl carboxylate; and

N,N,N-trimethyl ammonium toluyloxy benzene sulphonate.

Of the above classes of bleach precursors, the preferred classes are the esters, including acyl phenol sulphonates and acyl alkyl phenol sulphonates; acylamides; and the quaternary ammonium substituted peroxyacid precursors.

Highly preferred activators include sodium-4-benzoyloxy benzene sulphonate; N,N,N',N'-tetraacetyl ethylene diamine; sodium-1-methyl-2-benzoyloxy benzene-4-sulphonate; sodium-4-methyl-3-benzoyloxy benzoate; trimethyl ammonium toluyloxy benzene sulphonate; sodium nonanoyloxybenzene sulphonate; sodium 3,5,5,-trimethyl hexanoyloxybenzene sulphonate; glucose pentaacetate and tetraacetyl xylose.

Organic peroxyacids are also suitable as the peroxy compound. Such materials normally have a general formula:

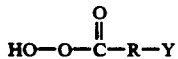

wherein R is an alkylene or substituted alkylene group containing from 1 to about 22 carbon atoms or a phenylene or substituted phenylene group, and Y is hydrogen, halogen, alkyl, aryl or

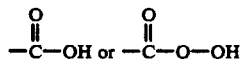

The organic peroxy acids usable in the present invention can contain either one or two peroxy groups and can be either aliphatic or aromatic. When the organic peroxy acid is aliphatic, the unsubstituted acid has the general formula:

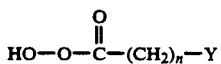

where Y can be, for example, H, $CH_3$, $CH_2Cl$, COOH, or COOOH; and n is an integer from 1 to 20.

When the organic peroxy acid is aromatic, the unsubstituted acid has the general formula:

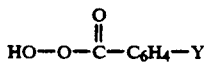

wherein Y is hydrogen, alkyl, alkylhalogen, halogen, or COOH or COOOH.

Typical monoperoxy acids useful herein include alkyl peroxy acids and aryl peroxy acids such as:
 (i) peroxybenzoic acid and ring-substituted peroxybenzoic acids, e.g. peroxy-α-naphthoic acid;
 (ii) aliphatic, substituted aliphatic and arylalkyl monoperoxy acids, e.g. peroxylauric acid, peroxystearic acid, and N,N-phthaloylaminoperoxycaproic acid.

Typical diperoxy acids useful herein include alkyl diperoxy acids and aryldiperoxy acids, such as:
 (iii) 1,12-diperoxydodecanedioic acid;
 (iv) 1,9-diperoxyazelaic acid;
 (v) diperoxybrassylic acid; diperoxysebacic acid and diperoxyisophthalic acid;
 (vi) 2-decyldiperoxybutane-1,4-dioic acid;
 (vii) 4,4'-sulfonylbisperoxybenzoic acid.

An inorganic peroxyacid salt usable herein is, for example, potassium monopersulphate.

A detergent bleach composition of the invention can be formulated by combining effective amounts of the components. The term "effective amounts" as used herein means that the ingredients are present in quantities such that each of them is operative for its intended purpose when the resulting mixture is combined with water to form an aqueous medium which can be used to wash and clean clothes, fabrics and other articles.

In particular, the detergent bleach composition can be formulated to contain, for example, from about 2% to 30% by weight, preferably from 5 to 25% by weight, of a peroxide compound.

Peroxyacids may be utilized in somewhat lower amounts, for example from 1% to about 15% by weight, preferably from 2% to 10% by weight.

Peroxyacid precursors may be utilized in combination with a peroxide compound in approximately the same level as peroxyacids, i.e. 1% to 15%, preferably from 2% to 10% by weight.

The manganese complex catalyst will be present in such formulations in amounts so as to provide the required level of Mn in the wash liquor. Normally, an amount of manganese complex catalyst is incorporated in the formulation which corresponds to a Mn content of from 0.0005% to about 0.5% by weight, preferably 0.001% to 0.25% by weight.

The bleach catalyst of the invention is compatible with substantially any known and common surface-active agents and detergency builder materials.

The surface-active material may be naturally derived, such as soap, or a synthetic material selected from anionic, nonionic, amphoteric, zwitterionic, cationic actives and mixtures thereof. Many suitable actives are commercially available and are described in the literature, for example in "Surface Active Agents and Detergents", Volumes I and II, by Schwartz, Perry and Berch. The total level of the surface-active material may range up to 50% by weight, preferably being from about 1% to 40% by weight of the composition, most preferably 4 to 25%.

Synthetic anionic surface-actives are usually water-soluble alkali metal salts of organic sulphates and sulphonates having alkyl groups containing from about 8 to about 22 carbon atoms, the term alkyl being used to include the alkyl portion of higher aryl groups.

Examples of suitable synthetic anionic detergent compounds are sodium and ammonium alkyl sulphates, especially those obtained by sulphating higher ($C_8$–$C_{18}$) alcohols produced, for example, from tallow or coconut oil; sodium and ammonium alkyl ($C_9$–$C_{20}$) benzene sulphonates, particularly sodium linear secondary alkyl ($C_{10}$–$C_{15}$) benzene sulphonates; sodium alkyl glyceryl ether sulphates, especially those esters of the higher alcohols derived from tallow or coconut oil and synthetic alcohols derived from petroleum; sodium coconut oil fatty acid monoglyceride sulphates and sulphonates; sodium and ammonium salts of sulphuric acid esters of higher ($C_9$–$C_{18}$) fatty alcohol alkylene oxide, particularly ethylene oxide, reaction products; the reaction products of fatty acids such as coconut fatty acids esterified with isethionic acid and neutralized with sodium hydroxide; sodium and ammonium salts of fatty acid amides of methyl taurine; alkane monosulphonates such as those derived by reacting alphaolefins ($C_8$–$C_{20}$) with sodium bisulphite and those derived by reacting paraffins with $SO_2$ and $Cl_2$ and then hydrolyzing with a base to produce a random sulphonate; sodium and ammonium $C_7$–$C_{12}$ dialkyl sulfosuccinates; and olefin sulphonates, which term is used to describe the material made by reacting olefins, particularly $C_{10}$–$C_{20}$ alphaolefins, with $SO_3$ and then neutralizing and hydrolyzing the reaction product. The preferred anionic detergent compounds are sodium ($C_{11}$–$C_{15}$) alkylbenzene sulphonates, sodium ($C_{16}$–$C_{18}$) alkyl sulphates and sodium ($C_{16}$–$C_{18}$) alkyl ether sulphates.

Examples of suitable nonionic surface-active compounds which may be used, include in particular the reaction products of alkylene oxides, usually ethylene oxide, with alkyl ($C_6$–$C_{22}$) phenols, generally 5–25 EO, i.e. 5–25 units of ethylene oxides per molecule; the condensation products of aliphatic ($C_8$–$C_{18}$) primary or secondary linear or branched alcohols with ethylene oxide, generally 3–30 EO, and products made by condensation of ethylene oxide with the reaction products of propylene oxide and ethylene diamine. Other so-called nonionic surface-actives include alkyl polyglycosides, long chain tertiary amine oxides, long chain tertiary phosphine oxides and dialkyl sulphoxides.

Amounts of amphoteric or zwitterionic surface-active compounds can also be used in the compositions of the invention but this is not normally desired owing to their relatively high cost. If any amphoteric or zwitterionic detergent compounds are used, it is generally in small amounts in compositions based on the much more commonly used synthetic anionic and nonionic actives.

As stated above, soaps may also be incorporated in the compositions of the invention, preferably at a level of less than 25% by weight. They are particularly useful at low levels in binary (soap/anionic) or ternary mixtures together with nonionic or mixed synthetic anionic and nonionic compounds. Soaps which are used, are preferably the sodium, or, less desirably, potassium salts of saturated or unsaturated $C_{10}$–$C_{24}$ fatty acids or mixtures thereof. The amount of such soaps can be varied between about 0.5% and about 25% by weight, with lower amounts of about 0.5% to about 5% being generally sufficient for lather control. Amounts of soap between about 2% and about 20%, especially between about 5% and about 10%, are used to give a beneficial effect on detergency. This is particularly valuable in compositions used in hard water when the soap acts as a supplementary builder.

The detergent compositions of the invention will normally also contain a detergency builder. Builder materials may be selected from 1) calcium sequestrant materials, 2) precipitating materials, 3) calcium ion-exchange materials and 4) mixtures thereof.

Examples of calcium sequestrant builder materials include alkali metal polyphosphates, such as sodium tripolyphosphate; nitrilotriacetic acid and its water-soluble salts; the akali metal salts of ether polycarboxylates, such as carboxymethyloxy succinic acid, oxydisuccinic acid, mellitic acid; ethylene diamine tetraacetic acid; benzene polycarboxylic acids; citric acid; and polyacetal carboxylates as disclosed in U.S. Pat. Nos. 4,144,226 and 4,146,495.

Examples of precipitating builder materials include sodium orthophosphate, sodium carbonate and sodium carbonate/calcite.

Examples of calcium ion-exchange builder materials include the various types of water-insoluble crystalline or amorphous aluminosilicates, of which zeolites are the best known representatives.

In particular, the compositions of the invention may contain any one of the organic or inorganic builder materials, such as sodium or potassium tripolyphosphate, sodium or potassium pyrophosphate, sodium or potassium orthophosphate, sodium carbonate or sodium carbonate/ calcite mixtures, the sodium salt of nitrilotriacetic acid, sodium citrate, carboxymethyl malonate, carboxymethyloxy succinate and the water-insoluble crystalline or amorphous aluminosilicate builder materials, or mixtures thereof.

These builder materials may be present at a level of, for example, from 5 to 80% by weight, preferably from 10 to 60% by weight.

Apart from the components already mentioned, the detergent compositions of the invention can contain any of the conventional additives in the amounts in which such materials are normally employed in fabric washing detergent compositions. Examples of these additives include lather boosters, such as alkanolamides, particularly the monoethanol amides derived from palmkernel fatty acids and coconut fatty acids, lather depressants, such as alkyl phosphates and silicones, anti-redeposition agents, such as sodium carboxymethyl cellulose and alkyl or substituted alkyl cellulose ethers, other stabilizers, such as ethylene diamine tetraacetic acid and the phosphonic acid derivatives (i.e. Dequest ® types), fabric softening agents, inorganic salts, such as sodium sulphate, and, usually present in very small amounts, fluorescent agents, perfumes, enzymes, such as proteases, cellulases, lipases, amylases and oxidases, germicides and colorants.

Another optional but highly desirable additive ingredient with multifunctional characteristics in detergent compositions is from 0.1% to about 3% by weight of a polymeric material having a molecular weight of from 1,000 to 2,000,000 and which can be a homo- or copolymer of acrylic acid, maleic acid, or salt or anhydride thereof, vinyl pyrrolidone, methyl- or ethylvinyl ethers, and other polymerizable vinyl monomers. Preferred examples of such polymeric materials are polyacrylic acid or polyacrylate; polymaleic acid/acrylic acid copolymer; 70:30 acrylic acid/hydroxyethyl maleate copolymer; 1:1 styrene/maleic acid copolymer; isobutylene/maleic acid and diisobutylene/maleic acid copolymers; methyl- and ethylvinyl ether/maleic acid copolymers; ethylene/maleic acid copolymer; polyvinyl pyrrolidone; and vinyl pyrrolidone/maleic acid copolymer.

Detergent bleach compositions of the invention, when formulated as free-flowing particles, e.g. in powdered or granulated form, can be produced by any of the conventional techniques employed in the manufacture of detergent compositions, for instance by slurry-making, followed by spray-drying to form a detergent base powder to which the heat-sensitive ingredients including the peroxy compound bleach and optionally some other ingredients as desired, and the bleach catalyst, can be added as dry substances.

It will be appreciated, however, that the detergent base powder compositions to which the bleach catalyst is added can itself be made in a variety of other ways, such as the so-called part-part processing, non-tower route processing, dry-mixing, agglomeration, granulation, extrusion, compacting and densifying processes etc., such ways being well known to those skilled in the art and not forming the essential part of the present invention.

Advantageously, it is useful to separate the manganese complex from the peroxygen compound and other components of the detergent-base powder. This may be accomplished through granulation or noodling (through an extruder) the manganese complex within a protective matrix shell. Sodium sulfate and other inorganic or organic substances along with binders may be useful in forming the manganese complex protective particles.

Alternatively, the bleach catalyst can be added separately to a wash/bleach water containing the peroxy compound bleaching agent.

In that case, the bleach catalyst is presented as a detergent additive product. Such additive products are intended to supplement or boost the performance of conventional detergent compositions and may contain any of the components of such compositions, although they will not comprise all of the components as present in a fully formulated detergent composition. Additive products in accordance with this aspect of the invention will normally be added to an aqueous liquor containing a source of (alkaline) hydrogen peroxide, although in certain circumstances the additive product may be used as separate treatment in a prewash or in the rinse.

Additive products in accordance with this aspect of the invention may comprise the compound alone or, preferably, in combination with a carrier, such as a compatible aqueous or nonaqueous liquid medium or a particulate substrate or a flexible nonparticulate substrate.

The following examples will more fully illustrate the embodiments of this invention. All parts, percentages and proportions referred to herein and in the appended claims are by weight unless otherwise indicated.

EXAMPLE 1

Preparation of $Mn(IV)MeTACN(OMe)_3(PF_6)$

Manganese (II) chloride was obtained from Strem Chemicals, Inc. Sodium hexafluorophosphate was obtained from Aldrich Chemical Company. Sodium methoxide was prepared from sodium hydride (Aldrich) and methanol. N,N',N''-trimethyl, 1,4,7-triazacyclononane (MeTACN) was prepared according to the literature procedure from Atkins, et al. "Organic Synthesis", 58 86, 1978.

A degassed (dual-manifold vacuum line technique) solution of 2.5g MeTACN in 40 ml methanol was chilled in an ice/salt bath. To this solution was added 1.84 g manganese chloride dissolved in 10 ml methanol. The solution turned light brown. Subsequently, 20 ml of IM NaOMe was added all at once whereupon the solution turned darker brown. After stirring about 10 minutes, 5.0 g $NaPF_6$ (in 20 ml methanol) was added and the solution was exposed to air. About 20-30 minutes later, a further amount of 5.0 g $NaPF_6$ (in 20 ml methanol) was added, and the solution was allowed to warm to room temperature. The solution was then filtered and cooled to 0° C. to promote crystallization. After three days, dark brown crystals formed which were filtered. Yield 0.5 g (16% -based on NaOMe). More crystals were obtained from later crystallizations, but often these contained co-crystallized salt.

Elemental analysis: Calculated for $C_{12}H_{30}F_6MnN_3O_3P$: C, 31.03; H, 6.47; Mn, 11.85; N, 9.05; P, 6.68.

Found: C, 29.28; H, 5.68; Mn, 10.60; N, 9.20; P, 6.86.
Mass spectral analysis: m/e 319.

UV analysis ($CH_3CN$): lambda max (nm) (E, L $mol^{-1} cm^{-1}$) 326 (11,200), 287 (10,900), 228 (9800).

Melting range: 160°-165° C.

EXAMPLE 2

The bleach activating ability of $Mn(IV)(MeTACN)(OCH_3)_3(PF_6)$ was demonstrated on Ragu stained and tea stained (BC-1) cotton cloths at various active levels and various active oxygen levels.

Bleaching Terg-O-Tometer experiments were performed at 40° C. using the recommended dose of detergent powder (1.55 g/L of zeolite containing base powder) in deionized, distilled water, for a 15-minute wash with 2 or 4 stained cloths per one liter pot. The bleaching catalyst (Mn catalyst) was added as a 5% $Na_2SO_4$ powder blend. The performance of the monomer, $Mn(IV)(MeTACN)(OCH_3)_3(PF_6)$ was compared to the performance of another manganese bleach catalyst, the dinuclear manganese complex, $Mn(IV)(MeTACN)_2(\mu-O)_3(PF_6)_2 \cdot H_2O$. Results are listed under Table I.

Bleaching values are reported as changes in reflectance (R) or (B) units (LAB scale) as measured using a Colorgard/System/05 Reflectometer. Since peroxide-only controls were also conducted on the same type stains, bleaching was actually reported as $\Delta\Delta B$ and $\Delta\Delta R$ which are calculated as $\Delta\Delta R = \Delta R(wash) - \Delta R(blank)$ and $\Delta\Delta B = -(\Delta B(wash) - \Delta B(blank))$ and, therefore, the higher the number, the better the performance.

TABLE I

| Ragu Bleaching Studies (Mn catalysts) | |
|---|---|
| $Mn(IV)(MeTACN)(OCH_3)_3$ $\Delta\Delta B$ | $Mn(IV)_2(MeTACN)_2(\mu\text{-}O)_3$ $\Delta\Delta B$ |
| 48 ppm [O]   9.7 | 0.6 |
| 24 ppm [O]   9.1 | 0.6 |
| 12 ppm [O]   6.7 | 1.2 |
| 6 ppm [O]    7.2 | 0.8 |

Conditions: 4 ppm Mn complex, 40° C., 15 minute wash, pH = 10, 1.55 g/L Zeolite Base, [O] = active oxygen added as sodium perborate.

These results indicate that the Mn monomer, $Mn(IV)(MeTACN)(OCH_3)_3(PF_6)$, activates hydrogen peroxide to remove the hydrophobic Ragu stain. It performed much better than the corresponding dinuclear Mn catalyst at the same level of actives on this "oily" stain.

EXAMPLE 3

This Example presents the results of bleaching studies with $Mn(IV)(MeTACN)(OCH_3)_3(PF_6)$ on tea stained cloth. Test values are reported under Table II.

TABLE II

| Tea Stain (BC-1) Bleaching Studies (Mn Catalysts) | |
|---|---|
| $Mn(IV)(MeTACN)(OCH_3)_3$ $\Delta\Delta R$ | $Mn(IV)_2(MeTACN)_2(\mu\text{-}O)_3$ $\Delta\Delta R$ |
| 48 ppm [O]   21.2 | 18.5 |
| 24 ppm [O]   16.0 | 12.1 |
| 12 ppm [O]   11.7 | 8.4 |
| 6 ppm [O]    7.1 | 4.1 |

Conditions: 4 ppm Mn complex, 40° C., 15 minute wash, pH = 10, 1.55 g/l Zeolite base powder, [O] = active oxygen added as sodium perborate.

These results again indicate that the Mn monomer is a very efficient bleach and again is somewhat better at removing the tea stain that the corresponding dinuclear Mn bleach catalyst. Comparing the performance at various active oxygen levels also indicates that the monomer gives comparable bleaching of the tea stain at 30-50% lower active oxygen levels than the manganese dimer.

EXAMPLE 4

This Example details results similar to that of Example 3 but evaluates the effectiveness of extremely low levels of catalysts. Test results are reported under Table III.

TABLE III

Tea Stain (BC-1) Bleaching Studies (Mn Catalysts)

|  | Mn(IV)(MeTACN)(OCH₃)₃ AAR | Mn(IV)₂(MeTACN)₂ (μ-O)₃ AAR |
|---|---|---|
| 4 ppm Mn complex | 21.1 | 18.5 |
| 2 ppm Mn complex | 16.0 | 12.1 |
| 1 ppm Mn complex | 12.1 | 10.0 |

Conditions: 40° C., 15 minute wash, pH = 10, 48 ppm active oxygen added as sodium perborate, 1.55 g/L zeolite base powder.

These results show that at even lower catalyst levels sufficient bleaching is occurring and again is comparable to or somewhat better than the corresponding dinuclear manganese bleach catalyst.

EXAMPLE 5

This Example illustrates the effectiveness of Mn(IV)-(MeTACN)(OCH₃)₃(PF₆) with respect to a variety of different bleachable stains. Test results are reported under Table IV.

TABLE IV

Stain Bleaching Studies with Mn(IV)(MeTACN)(OCH₃)₃

|  | Perborate-only AR(−AB) | Mn(IV)(MeTACN) (OCH₃)₃ AR(−AB) |
|---|---|---|
| Tea Stain (BC-1) | −0.5 | 21.7 |
| Ragu | 5.5 | 15.2 |
| Red Wine (EMPA-114) | 13.2 | 35.1 |

Conditions: 4 ppm Mn complex, 40° C., 15 minute wash, pH = 10, 1.55 g/L zeolite base powder, 48 ppm active oxygen added as sodium perborate.

The results in Table IV indicate that the Mn monomer, Mn(IV)(MeTACN)(OCH₃)₃(PF₆), is effective on a variety of very different bleachable stains. The catalyst is effective on both hydrophobic and hydrophilic stains and performs at very low levels to clean and bleach very difficult stains.

EXAMPLE 6

This Example illustrates the effectiveness of Mn(IV)-(MeTACN)(OCH₃)₃(PF₆) as it performes in conjunction with different peracids. Test results are reported under Table V.

TABLE V

Catalyzed Peracid Bleaching Studies with Mn(IV)(MeTACN)(OCH₃)₃

|  | Without Catalyst AAR | With Catalyst AAR |
|---|---|---|
| Peracetic Acid | 9.7 | 26.0 |
| Sodium Monopersulfate | 29.8 | 37.6 |

Conditions: 4 ppm Mn complex, 40° C., 15 minute wash, pH = 10, 1.55 g/L zeolite base powder, 8 × 10⁻³M peracid, Tea stained cloths (BC-1).

These results show that Mn(IV)(MeTACN-)(OCH₃)₃(PF₆) effectively catalyzes the bleaching of peracids as well as hydrogen peroxide at very low levels of catalyst (4 ppm) on tea stained cloth. The activated peracetic acid performed almost three times as effectively as the peracid alone and the activated monopersulfate removed all of the tea stain from the cloth leaving the initially brown cloth totally white.

The foregoing description and examples illustrate selected embodiments of the present invention. In light thereof, various modifications will be suggested to one skilled in the art, all of which are within the spirit and purview of this invention.

What is claimed is:

1. A catalyst having the formula:

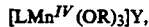

wherein
   Mn is manganese in the +4 oxidation state;
   R is a $C_1$–$C_{20}$ radical selected from the group consisting of alkyl, cycloalkyl, aryl, benzyl and radical combinations thereof;
   at least two R radicals may also be connected to one another so as to form a bridging unit between two oxygens that coordinate with the manganese;
   L is a ligand selected from a $C_3$–$C_{60}$ radical having at least 3 nitrogen atoms coordinating with the manganese; and
   Y is an oxidatively-stable counterion dependent.

2. A catalyst according to claim 1, wherein said ligand L is 1,4,7-trimethyl-1,4,7-triazacyclononane.

3. A catalyst according to claim 1, wherein said ligand L is 2-methyl-1,4,7-trimethyl-1,4,7-triazacyclononane.

4. A catalyst according to claim 1 which is Mn(IV)-(MeTACN)(OCH₃)₃(PF₆).

5. A bleaching composition comprising:
   i) from about 1 to about 60% by weight of a peroxy compound; and
   (ii) a manganese complex present in an effective amount for catalyzing bleaching activity of the peroxy compound and having the structure:

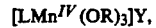

wherein
   Mn is manganese in the +4 oxidation state;
   R is a $C_1$–$C_{20}$ radical selected from the group consisting of alkyl, cycloalkyl, aryl, benzyl and radical combinations thereof;
   at least two R radicals may also be connected to one another so as to form a bridging unit between two oxygens that coordinate with the manganese;
   L is a ligand selected from a $C_3$–$C_{60}$ radical having at least 3 nitrogen atoms coordinating with the manganese; and
   Y is an oxidatively-stable counterion.

6. A composition according to claim 5, wherein said ligand L is 1,4,7-trimethyl-1,4,7-triazacyclononane.

7. A composition according to claim 5, wherein said ligand L is 2-methyl-1,4,7-trimethyl-1,4,7-triazacyclononane.

8. A composition according to claim 5, wherein said manganese complex is Mn(IV)(MeTACN-)(OCH₃)₃(PF₆).

9. A composition according to claim 5, which comprises said peroxy compound at a level of from 2 to 30% by weight and said catalyst at a level corresponding to a manganese content of from 0.0005% to 0.5% by weight.

10. A composition according to claim 5, wherein said manganese content is from 0.001% to 0.25% by weight.

11. A composition according to claim 5, wherein said peroxy compound is selected from the group consisting of hydrogen peroxide, hydrogen peroxide-liberating compounds, hydrogen peroxide-generating systems, peroxyacids and their salts, and peroxyacid bleach precursors, and mixtures thereof.

12. A composition according to claim 5, which further comprises a surface-active material in an amount from 0.5% to 50% by weight.

13. A composition according to claim 5, which further comprises a detergency builder in an amount from 5 to 80% by weight.

14. A composition according to claim 5, which further comprises an enzyme selected from the group consisting of proteases, cellulases, lipases, amylases, oxidases and mixtures thereof.

15. A method is provided for bleaching a stained substrate, the method comprising contacting the stained substrate in an aqueous medium with a peroxy compound and a manganese complex each in an effective amount to interact with one another and provide a cleaning effect upon the substrate, the complex having the formula:

$$[LMn^{IV}(OR)_3]Y,$$

wherein

Mn is manganese in the +4 oxidation state;

R is a $C_1$–$C_{20}$ radical selected from the group consisting of alkyl, cycloalkyl, aryl, benzyl and radical combinations thereof;

at least two R radicals may also be connected to one another so as to form a bridging unit between two oxygens that coordinate with the manganese;

L is a ligand selected from a $C_3$–$C_{60}$ radical having at least 3 nitrogen atoms coordinating with the manganese; and Y is an oxidatively-stable counterion.

16. A method according to claim 15, wherein said substate is a fabric.

17. A method according to claim 15, wherein said substate is a dishware.

18. A method according to claim 15, wherein said substate is a denture.

19. An aqueous medium comprising the manganese catalyst of claim 1 at a level from 0.001 ppm to 100 ppm of manganese and a peroxy compound that delivers active oxygen at a level from 0.01 ppm to 250 ppm.

* * * * *